US011991312B2

(12) United States Patent
Fahlgren et al.

(10) Patent No.: US 11,991,312 B2
(45) Date of Patent: May 21, 2024

(54) SYSTEM AND METHOD FOR QUEUING A COMMUNICATION SESSION

(71) Applicant: Twilio Inc., San Francisco, CA (US)

(72) Inventors: Christer Jan Erik Fahlgren, San Francisco, CA (US); John Robert Wolthuis, San Francisco, CA (US); Peter Shafton, San Francisco, CA (US); Thomas Schiavone, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 18/075,985

(22) Filed: Dec. 6, 2022

(65) Prior Publication Data
US 2023/0112621 A1 Apr. 13, 2023

Related U.S. Application Data

(63) Continuation of application No. 16/413,991, filed on May 16, 2019, now Pat. No. 11,546,471, which is a (Continued)

(51) Int. Cl.
H04M 3/51 (2006.01)
H04M 3/00 (2006.01)
(Continued)

(52) U.S. Cl.
CPC .......... H04M 3/523 (2013.01); H04M 3/5141 (2013.01); H04M 2203/407 (2013.01)

(58) Field of Classification Search
CPC ...... H04M 3/5238; H04M 3/523; H04M 3/51; H04M 3/5166; H04M 3/5183;
(Continued)

(56) References Cited

U.S. PATENT DOCUMENTS 5,274,700 A 12/1993 Gechter et al.
5,506,898 A * 4/1996 Costantini ............. H04M 3/523
379/88.16
(Continued)

FOREIGN PATENT DOCUMENTS

DE 1684587 A1 3/1971
EP 0282126 A2 9/1988
(Continued)

OTHER PUBLICATIONS

"Aepona's API Monetization Platform Wins Best of 4G Awards for Mobile Cloud Enabler", 4G World 2012 Conference & Expo, [Online]. [Accessed Nov. 5, 2015]. Retrieved from the Internet: <URL: https://www.realwire.com/releases/%20Aeponas-API-Monetization>, (Oct. 30, 2012), 4 pgs.
(Continued)

Primary Examiner — Kharye Pope
(74) Attorney, Agent, or Firm — Schwegman Lundberg & Woessner, P.A.

(57) ABSTRACT

A system and method including receiving a request to enqueue a communication session; adding the communication session to the queue of a plurality of communication sessions; upon adding the communication to the queue, transferring control logic to the configured wait-state application; receiving a dequeue request initiated by a second entity; in response to the dequeue request, managing the procession of communication sessions in the queue; and dequeuing a communication session from the queue.

20 Claims, 11 Drawing Sheets

Related U.S. Application Data continuation of application No. 14/966,987, filed on Dec. 11, 2015, now Pat. No. 10,320,983, which is a continuation of application No. 13/921,941, filed on Jun. 19, 2013, now Pat. No. 9,247,062.

(60) Provisional application No. 61/661,730, filed on Jun. 19, 2012.

(51) Int. Cl.
*H04M 3/523* (2006.01)
*H04L 12/66* (2006.01)

(58) Field of Classification Search
CPC .......... H04M 3/5232; H04M 3/42059; H04M 3/493; H04M 3/5175; H04M 3/5191; H04M 3/5233; H04M 3/4286; H04L 67/10; H04L 67/141; H04L 67/306; H04L 63/10; H04L 67/02; H04L 61/308; H04L 67/32; H04L 41/5096; H04L 45/44; H04L 47/762; H04L 47/822; G06F 9/547; G06F 17/30522; G06F 17/30867; G06F 2009/4557; G06F 2221/2141
USPC ............ 379/266.06, 265.02, 265.09, 265.01, 379/266.03, 266.01, 265.11; 709/206, 709/203, 201; 719/330, 320, 328; 370/352
See application file for complete search history.

(56) References Cited

U.S. PATENT DOCUMENTS

| | | |
|---|---|---|
| 5,526,416 A | 6/1996 | Dezonno et al. |
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,046,762 A | 4/2000 | Sonesh et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Strom et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,058,181 B2 | 6/2006 | Wright et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,099,442 B2 | 8/2006 | Da Palma et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| D540,074 S | 4/2007 | Peters |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |

(56) References Cited

U.S. PATENT DOCUMENTS

| | | |
|---|---|---|
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,073,962 B2 | 12/2011 | Parkinson et al. |
| 8,078,483 B1 | 12/2011 | Hirose et al. |
| 8,081,958 B2 | 12/2011 | Soderstrom et al. |
| 8,103,725 B2 | 1/2012 | Gupta et al. |
| 8,121,262 B1 * | 2/2012 | Michaelis ......... H04M 1/72513 455/415 |
| 8,126,128 B1 | 2/2012 | Hicks, III et al. |
| 8,126,129 B1 | 2/2012 | Mcguire |
| 8,130,750 B2 | 3/2012 | Hester |
| 8,130,917 B2 | 3/2012 | Helbling et al. |
| 8,139,730 B2 | 3/2012 | Da Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,244,822 B1 | 8/2012 | Lowry et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | Mckeown |
| 8,355,394 B2 | 1/2013 | Taylor et al. |
| 8,411,669 B2 | 4/2013 | Chen et al. |
| 8,411,843 B1 * | 4/2013 | Cyriac ................ H04M 3/4288 379/266.03 |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien |
| 8,467,502 B2 | 6/2013 | Sureka et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |

(56) References Cited

U.S. PATENT DOCUMENTS

| | | |
|---|---|---|
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,071,677 B2 | 6/2015 | Aggarwal et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,247,062 B2 | 1/2016 | Fahlgren et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 10,320,983 B2 | 6/2019 | Fahlgren et al. |
| 11,546,471 B2 | 1/2023 | Fahlgren et al. |
| 2001/0028649 A1 | 10/2001 | Pogossiants et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong et al. |
| 2002/0165957 A1 | 11/2002 | Devoe et al. |
| 2002/0176378 A1 | 11/2002 | Hamilton et al. |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1* | 3/2003 | Sundaram ............... H04L 12/66 709/227 |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matenda et al. |
| 2005/0008141 A1* | 1/2005 | Kortum ............... H04M 3/523 379/266.06 |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler, Jr. |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |

(56) References Cited

U.S. PATENT DOCUMENTS

| | | |
|---|---|---|
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0130069 A1 | 6/2006 | Srinivasan et al. |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0209797 A1 | 9/2006 | Anisimov et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0218560 A1 | 9/2006 | Dadiomov et al. |
| 2006/0222166 A1 | 10/2006 | Ramakrishna et al. |
| 2006/0235715 A1 | 10/2006 | Abrams et al. |
| 2006/0245577 A1 | 11/2006 | Mancuso et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0152116 A1 | 6/2008 | Sylvain |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0260138 A1 | 10/2008 | Chen et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317058 A1 | 12/2008 | Williams |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0074166 A1 | 3/2009 | Pavlic et al. |
| 2009/0075684 A1 | 3/2009 | Cheng et al. |
| 2009/0080641 A1* | 3/2009 | Fitzgerald ............ H04M 3/493 379/265.11 |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0094674 A1 | 4/2009 | Schwartz et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |

(56) References Cited

U.S. PATENT DOCUMENTS

| | | |
|---|---|---|
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0054431 A1 | 3/2010 | Jaiswal et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0210245 A1* | 8/2010 | Kim ................ H04W 4/16 455/412.1 |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0303227 A1* | 12/2010 | Gupta ................ H04M 1/247 379/266.06 |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0125894 A1 | 5/2011 | Anderson et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0201365 A1 | 8/2012 | Brown et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036427 A1 | 2/2013 | Chen et al. |
| 2013/0036476 A1 | 2/2013 | Roever et al. |
| 2013/0047232 A1 | 2/2013 | Tuchman et al. |
| 2013/0051549 A1* | 2/2013 | Klemm ............. H04M 3/5238 379/266.06 |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |

(56) References Cited

U.S. PATENT DOCUMENTS

| | | |
|---|---|---|
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0246944 A1 | 9/2013 | Pandiyan et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2016/0011758 A1 | 1/2016 | Dornbush et al. |
| 2016/0077693 A1 | 3/2016 | Meyer et al. |
| 2016/0100060 A1 | 4/2016 | Fahlgren et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |
| 2016/0239770 A1 | 8/2016 | Batabyal et al. |
| 2017/0339283 A1 | 11/2017 | Chaudhary et al. |
| 2020/0053221 A1 | 2/2020 | Fahlgren et al. |

FOREIGN PATENT DOCUMENTS

| | | |
|---|---|---|
| EP | 1464418 A1 | 10/2004 |
| EP | 1522922 A2 | 4/2005 |
| EP | 1770586 A1 | 4/2007 |
| EP | 2053869 A1 | 4/2009 |
| ES | 2134107 A1 | 9/1999 |
| JP | 10294788 A | 11/1998 |
| JP | 2004166000 A | 6/2004 |
| JP | 2004220118 A | 8/2004 |
| JP | 2006319914 A | 11/2006 |
| WO | WO-9732448 A1 | 9/1997 |
| WO | WO-2002087804 A1 | 11/2002 |
| WO | WO-2006037492 A1 | 4/2006 |
| WO | WO-2009018489 A2 | 2/2009 |
| WO | WO-2009124223 A1 | 10/2009 |
| WO | WO-2010037064 A1 | 4/2010 |
| WO | WO-2010040010 A1 | 4/2010 |
| WO | WO-2010101935 A1 | 9/2010 |
| WO | WO-2011091085 A1 | 7/2011 |

OTHER PUBLICATIONS

"U.S. Appl. No. 13/921,941, Examiner Interview Summary dated Jul. 14, 2014", 3 pgs.

"U.S. Appl. No. 13/921,941, Examiner Interview Summary dated Aug. 12, 2015", 3 pgs.

"U.S. Appl. No. 13/921,941, Examiner Interview Summary dated Aug. 13, 2014", 2 pgs.

"U.S. Appl. No. 13/921,941, Final Office Action dated Aug. 14, 2014", 22 pgs.

"U.S. Appl. No. 13/921,941, Non Final Office Action dated Feb. 18, 2015", 19 pgs.

"U.S. Appl. No. 13/921,941, Non Final Office Action dated Apr. 11, 2014", 17 pgs.

"U.S. Appl. No. 13/921,941, Non Final Office Action dated Oct. 3, 2013", 21 pgs.

"U.S. Appl. No. 13/921,941, Notice of Allowance dated Sep. 25, 2015", 19 pgs.

"U.S. Appl. No. 13/921,941, Response filed Jan. 3, 2014 to Non Final Office Action dated Oct. 3, 2013", 12 pgs.

"U.S. Appl. No. 13/921,941, Response filed Jul. 11, 2014 to Non Final Office Action dated Apr. 11, 2014", 11 pgs.

"U.S. Appl. No. 13/921,941, Response filed Aug. 17, 2015 to Non Final Office Action dated Feb. 18, 2015", 15 pgs.

"U.S. Appl. No. 13/921,941, Response filed Dec. 15, 2014 to Final Office Action dated Aug. 14, 2014", 11 pgs.

"U.S. Appl. No. 14/966,987, Examiner Interview Summary dated Oct. 20, 2016", 3 pgs.

"U.S. Appl. No. 14/966,987, Examiner Interview Summary dated Dec. 13, 2017", 3 pgs.

"U.S. Appl. No. 14/966,987, Final Office Action dated Jan. 27, 2017", 22 pgs.

"U.S. Appl. No. 14/966,987, Final Office Action dated Mar. 22, 2018", 20 pgs.

"U.S. Appl. No. 14/966,987, Non Final Office Action dated Aug. 11, 2016", 17 pgs.

"U.S. Appl. No. 14/966,987, Non Final Office Action dated Sep. 8, 2017", 15 pgs.

"U.S. Appl. No. 14/966,987, Notice of Allowance dated Jan. 25, 2019", 5 pgs.

"U.S. Appl. No. 14/966,987, Response filed Apr. 27, 2017 to Final Office Action dated Jan. 27, 2017", 7 pgs.

"U.S. Appl. No. 14/966,987, Response filed Jul. 17, 2018 to Final office Action dated Mar. 22, 2018", 11 pgs.

"U.S. Appl. No. 14/966,987, Response filed Oct. 17, 2016 to Non Final Office Action dated Aug. 11, 2016", 11 pgs.

"U.S. Appl. No. 14/966,987, Response filed Dec. 8, 2017 to Non Final Office Action dated Sep. 8, 2017", 9 pgs.

"U.S. Appl. No. 16/413,991, Examiner Interview Summary dated Feb. 8, 2022", 2 pgs.

"U.S. Appl. No. 16/413,991, Examiner Interview Summary dated Jul. 24, 2020", 3 pgs.

"U.S. Appl. No. 16/413,991, Examiner Interview Summary dated Oct. 5, 2021", 3 pgs.

"U.S. Appl. No. 16/413,991, Final Office Action dated Apr. 5, 2022", 11 pgs.

"U.S. Appl. No. 16/413,991, Final Office Action dated Jul. 28, 2021", 12 pgs.

(56) References Cited

OTHER PUBLICATIONS

"U.S. Appl. No. 16/413,991, Final Office Action dated Sep. 23, 2020", 14 pgs.
"U.S. Appl. No. 16/413,991, Non Final Office Action dated Feb. 12, 2021", 14 pgs.
"U.S. Appl. No. 16/413,991, Non Final Office Action dated Apr. 30, 2020", 13 pgs.
"U.S. Appl. No. 16/413,991, Non Final Office Action dated Nov. 5, 2021", 11 pgs.
"U.S. Appl. No. 16/413,991, Notice of Allowance dated Aug. 31, 2022", 7 pgs.
"U.S. Appl. No. 16/413,991, Preliminary Amendment filed Nov. 14, 2019", 7 pgs.
"U.S. Appl. No. 16/413,991, Response filed Mar. 7, 2022 to Non Final Office Action dated Nov. 5, 2021", 10 pgs.
"U.S. Appl. No. 16/413,991, Response filed May 12, 2021 to Non Final Office Action dated Feb. 12, 2021", 12 pgs.
"U.S. Appl. No. 16/413,991, Response filed Jul. 5, 2022 to Final Office Action dated Apr. 5, 2022", 10 pgs.
"U.S. Appl. No. 16/413,991, Response filed Jul. 17, 2020 to Non Final Office Action dated Apr. 30, 2020", 13 pgs.
"U.S. Appl. No. 16/413,991, Response filed Sep. 29, 2021 to Final Office Action dated Jul. 28, 2021", 13 pgs.
"U.S. Appl. No. 16/413,991, Response filed Dec. 23, 2020 to Final Office Action dated Sep. 23, 2020", 13 pgs.
"Archive Microsoft Office 365 Email I Retain Unified Archiving", GWAVA, Inc., Montreal, Canada, [Online] Retrieved from the Internet: <URL: http://www.gwava.com/Retain/Retain_for_Office_365.php>, (2015), 4 pgs.
"Complaint for Patent Infringement", *Telinit Technologies, LLC v. Twilio Inc* 2:12-cv-663, (Oct. 12, 2012), 17 pgs.
"Ethernet to Token Ring Bridge", Black Box Corporation, [Online] Retrieved from the Internet: <URL: http://blackboxcanada.com/resource/files/productdetails/17044.pdf>, (Oct. 1999), 2 pgs.
"Twilio Cloud Communications—APIs for Voice, VoIP, and Text Messaging", Twilio, [Online] Retrieved from the Internet: <URL: http://www.twilio.com/docs/api/rest/call-feedback>, (Jun. 24, 2015), 8 pgs.
Abu-Lebdeh, et al., "A 3GPP Evolved Packet Core-Based Architecture for QoS-Enabled Mobile Video Surveillance Applications", 2012 Third International Conference on the Network of the Future {NOF}, (Nov. 21-23, 2012), 1-6.
Barakovic, Sabina, et al., "Survey and Challenges of QoE Management Issues in Wireless Networks", Hindawi Publishing Corporation, (2012), 1-29.
Berners-Lee, T., "RFC 3986: Uniform Resource Identifier (URI): Generic Syntax", The Internet Society, [Online]. Retrieved from the Internet: <URL: http://tools.ietf.org/html/rfc3986>, (Jan. 2005), 57 pgs.
Kim, Hwa-Jong, et al., "In-Service Feedback QoE Framework", 2010 Third International Conference on Communication Theory. Reliability and Quality of Service, (2010), 135-138.
Matos, et al., "Quality of Experience-based Routing in Multi-Service Wireless Mesh Networks", Realizing Advanced Video Optimized Wireless Networks. IEEE, (2012), 7060-7065.
Mu, Mu, et al., "Quality Evaluation in Peer-to-Peer IPTV Services", Data Traffic and Monitoring Analysis, LNCS 7754, 302-319, (2013), 18 pgs.
Subramanya, et al., "Digital Signatures", IEEE Potentials, (Mar./Apr. 2006), 5-8.
Tran, et al., "User to User adaptive routing based on QoE", ICNS 2011: The Seventh International Conference on Networking and Services, (2011), 170-177.

\* cited by examiner

```
<Response>
  <Say>
    Please hold, a customer service representative will be with you shortly
  </Say>
  <Enqueue
      action="after_verb_exit.php"
      method="POST"
      waitUrl="hold_music.php"
      waitUrlMethod="GET">
      queue_name
  </Enqueue>
</Response>
```

FIGURE 4

```
<Response>
  <Dial>
    <Queue>queue_name</Queue>
  </Dial>
</Response>
```

FIGURE 8

SYSTEM AND METHOD FOR QUEUING A COMMUNICATION SESSION

CROSS-REFERENCE TO RELATED APPLICATIONS

This application is a continuation of U.S. patent application Ser. No. 16/413,991, filed May 16 May 2019, which is a continuation of U.S. patent application Ser. No. 14/966,987, filed 11 Dec. 2015, which is a continuation of U.S. patent application Ser. No. 13/921,941, filed 19 Jun. 2013, which claims the benefit of U.S. Provisional Application Ser. No. 61/661,730, filed on 19 Jun. 2012, all of which are incorporated in their entireties by this reference.

TECHNICAL FIELD

This invention relates generally to the telephony field, and more specifically to a new and useful system and method for queuing a communication session in the telephony field.

BACKGROUND

In recent years, telephony applications have seen advancement due in part to internet based interfaces for telephony applications. The application of internet-based technologies in telephony communication has dramatically expanded the possibilities for telephony applications. Voice or telephony based calls are often limited by the fact that often a user is on one end of the call. In many cases, the resources to support these callers, such as customer service representatives, cannot be dynamically scaled to meet demand. As a result, telephony applications place callers in a holding pattern with the familiar looping music and canned messages. Waiting to leave the holding pattern is an annoyance to the caller, and the bad user experience reflects poorly upon the operators of the telephony application. Additionally, a generic waiting experience will not be suitable for all applications using a telephony platform that supports a wide variety of applications. Some PBX solutions provide basic static customization of music and announcements, but fail to provide flexibility use the queue. Thus, there is a need in the telephony field to create a new and useful system and method for queuing a communication session. This invention provides such a new and useful system and method.

BRIEF DESCRIPTION OF THE FIGURES

FIG. 4 is a exemplary request to enqueue a communication session;

FIG. 8 is an exemplary request to dial a queue;

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
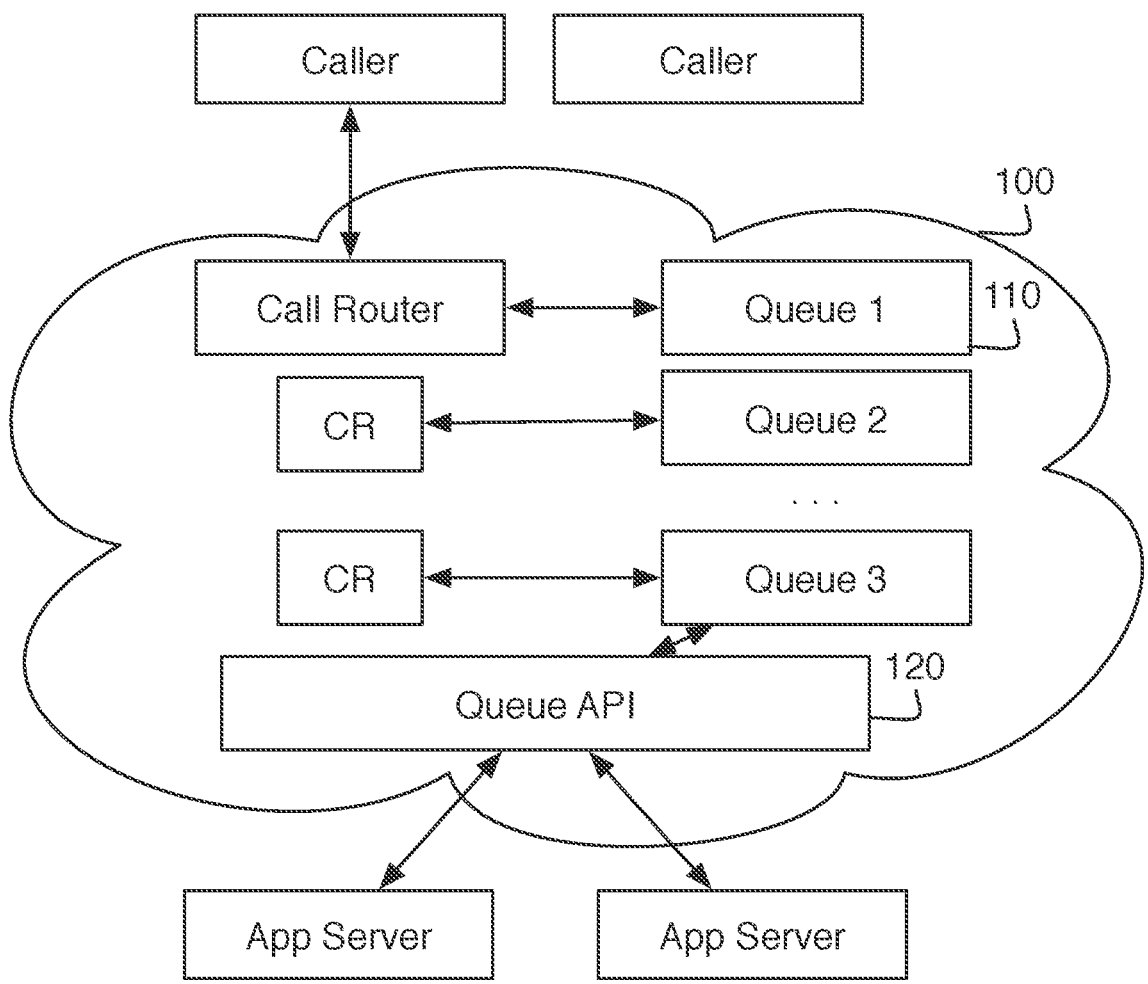
FIG. 1 is a schematic representation of a system of a preferred embodiment.

As shown in FIG. 1, a system for queuing a communication session of a preferred embodiment includes a multitenant communication platform 100, a queue management resource 110, and an API 120 with queue targeted interfaces. The system functions to enable programmatic and persistent queue resources. The system provides a platform tool wherein concurrent communication sessions can be simply managed while enabling advanced interaction capabilities. When implemented along with synchronous communication (e.g., telephone calls, video chats, screen-sharing, etc.), the system can be used as a tool for "call waiting". The system may additionally or alternatively be implemented for programmatic control of a queue for limited resources such as specialized processors, human facilitated processes, manufacturing tools, limited access resources, and/or any suitable resource limited component. The system preferably enables applications to simply direct inbound calls to a queue of their selection without implementing highly specialized queue application logic. The system is preferably provided to developers as a resource primitive that simplifies queue interactions and enables users of the platform (e.g., telephony application developers) to flexibly design customized and dynamic interactions. The system further functions to enable queues to be customized and interacted with dynamically and on the fly. Rich interactions and highly customized wait experiences can be generated by wait-state applications. When in the queue, the experience can be specifically tailored for the user through customized applications. Once an application is ready to connect a caller, a communication session can be easily popped off the queue and, using application instructions or an API, the communication session is directed to the appropriate place.

In an exemplary implementation, the system allows accounts or different applications to establish various call queues. The call queues can be for any suitable resource. In many cases, the call queue will be for a connection to an available agent (e.g., customer service representative). In other cases, the call queue could be to a limited resource such as a processing server that provides some unique service such as image processing. Communication sessions can preferably be enqueued during an active communication (e.g., an entity is concurrently participating in a live communication session) or in preparation for an eventually active communication session (e.g., a proxy for an upcoming call is enqueued and a live communication session is not active while waiting in the queue). A communication session may be enqueued in response to an API request and/or an instruction of an application. Any suitable number of queue resources can be generated for an account, and the platform can enable any suitable number of accounts to maintain queue resources. For example, an account on the platform may use the platform to provide a customer service phone system. There may be three call queues that are used for three different regions of customer support. Simultaneously, a second account may use a different queue setup to support a different application. The queues of the preferred embodiment are additionally configured for application execution during various states of waiting in the queue. Different applications, instructions, media resources or other resources can be set to be executed/played for a communication session for a particular state in the call queue. These various queue-state applications (as they may be generally referred) enable developers and account managers to customize the call queue experience.

The communication platform 100 of the preferred embodiment functions to provide a base service that participates in and/or facilitates communication with at least one endpoint. The communication platform can provide a wide variety of services. The communication platform can be a network provider to a collection of endpoints. The communication platform can alternatively include a plurality of call routers such that the communication platform 100 routes calls to various endpoints and/or services according to some configured logic. Preferably, the communication platform 100 facilitates executing communication applications. Communication applications are preferably uniquely configured by developers to provide a wide variety of different solutions such as implementing call trees, conference calls, customer service call systems, automated phone message service, voicemail, programmatic messaging/notifications, or any suitable application.

The communication platform 100 is preferably multi-medium and multitenant. The multi-medium aspect of the communication platform 100 can be defined as a communication platform that facilitates communication over multiple forms of communication. The forms of communication can include PSTN, SIP, SMS, MIMS, WebRTC, voice chat, video chat, screen-sharing sessions, IP based messaging, and/or other forms of communication. The communication platform 100 is preferably multitenant in the sense that multiple users, accounts, or entities share resources of the communication platform. The accounts preferably use account authentication practices when working with the application during graphical user interface configuration, API interactions, and/or during other suitable stages of account management. Accounts can further include sub-accounts or any suitable segmentation of application control and operation. The queues of an account are preferably independent from other queues and furthermore other accounts. In some variations, platform level queues may be used to manage account queues to provided resources of the communication platform. The communication platform is preferably a cloud service operating on a distributed computing system, but may alternatively be a computer cluster, an on-premise installation, or on any suitable computing infrastructure. The communication platform operates substantially similar to the communication platform described in U.S. Pat. No. 8,306,021, issued 2 Apr. 2009, which is hereby incorporated in its entirety by this reference. The communication platform may alternatively be any suitable network accessible platform.

The queue management resource 110 functions to control and alter the state of queue resources. The queue management resource 110 is preferably capable of instantiating, managing, and deleting a queue resource. When an item is instructed to be enqueued and a queue does not exist within the scope of that queue (e.g., within an account, sub-account, platform, etc.), the queue management resource preferably creates a queue resource and adds the enqueued item to the queue. Multiple queues may additionally be created within any given scope. Queues can preferably be specified by including a queue identifier in an enqueue request. An identifier for a non-existent queue preferably results in a queue with the specified queue identifier.

The items added to a queue are preferably communication sessions. The enqueued communication sessions can be added through any suitable process and do not have to originate from the same source. Some communication sessions may be added programmatically through the API, while some may be active communication sessions that transitioned to the queue to await the limited resource. An enqueued communication session can have at least two different states or modes of operation: an active state and an inactive state. The enqueued communication session may be an active communication session with a live participant on at least one endpoint of the communication. A wait-state application (e.g., queue-state application executed while waiting in the queue) will preferably execute and play audio or perform text-to-speech conversion or otherwise engage the connected endpoint as the caller waits. In another variation, the communication session is in an inactive state. An inactive communication session is preferably a proxy for a communication session. The proxy for a communication session is preferably not a live connection, but represents some entity or action that will occur upon dequeuing. The enqueued inactive communication session preferably includes a parameter specifying a communication endpoint that should be connected upon dequeuing. For example, an inactive communication session may be enqueued in response to a communication application of a received SMS message or in response to an API request. In this example, someone can get in a call waiting line and be connected when it's the entity's turn. A communication session can additionally transition between inactive and active. The queue is preferably persistent such that state or place of a communication session in the queue is maintained during changes in state of a communication session. For example, once in line, a caller can hangup (e.g., transition from active to inactive), and the queue will maintain the communication session and take appropriate action to connect the caller when the session is dequeued. A communication session proxy item is progressed through the queue, and upon dequeuing, the caller is connected.

The enqueued communication sessions can additionally be queried and/or manipulated through the API 120. Additionally, a queued communication (active, inactive or an alternative state), may be configured with various queue-state applications. Queue-state applications are preferably executable instructions, services, playable media, and the like that are set to be initiated and performed during particular stages of the queue. A queue-state application is preferably individually executed for a single communication session. Queue-state applications can include at least the variations of an added-state application, a wait-state application, and/or an action state application. There may alternatively be similar applications that execute in the background or interject into the communication sessions based on overall state of the queue or an account. An added-state application is preferably invoked before or alternatively directly after a communication session is added to a queue. The added-state application can be used to announce to the user that they have been added to a queue. A wait-state application is preferably invoked while the communication session is waiting. The wait-state application is preferably invoked repeatedly. Alternatively, the wait-state application may be invoked when updating position or in response to any suitable event. Each time the wait-state application is invoked, updated queue statistics (e.g., estimated wait time, place in the queue, etc.) may be supplied to the application. For example, the wait-state application may include text-to-speech instructions to read to the current user their place in line and then play music for one minute before ending. When this application is looped, the caller is updated with their wait position roughly every minute. The wait-state application may additionally be invoked for non-active communication sessions. Since there is no active endpoint connected in this variation, the wait-state application functions as a background script. For example, the wait-state application may be used to send an SMS message when the user's place in the queue is updated. The action-state application (i.e., an application for the newly dequeued-state) is preferably invoked in response to the communication session being dequeued. For example, the action-state application may play a message notifying a listener that the call is being connected. The action-state application may be configured or defined when a communication session is queued, when the queue is created, or when a dequeuing agent makes a dequeue request. A post-action application can be specified to be transferred control logic control after a dequeuer agent (e.g., a customer care representative) hangs up. Similarly, the control logic can be transferred to an original application that made the original enqueue request. For example, an initial application may include an enqueue instruction followed by instructions to receive customer feedback. A caller is first queued, then an agent helps the caller, and after the agent hangs up, the caller is transferred back to the original application so that the customer feedback instructions can execute. Any alternative types of applications may be configured or specified for the queue or for interactions with the queue. The queue management resource 110 additionally includes operational configuration to manage the procession of communication sessions in a queue resource. The queue is preferably managed to enable first in first out queue behavior. The queue can alternatively enforce first in last out queue behavior. The queue could also use various prioritization policies to enable particular queued items to be move through the queue faster or slower than other items. The queue management resource preferably selects the item to dequeue, updating remaining items in the queue to reflect their new position, and add an item to the queue. The queue management resource is preferably responsive to the queue targeted API calls and particular application instructions.

The API 120 with queue targeted interfaces functions to enable programmatic interaction with queued items. An API 120 is preferably a REST API. The API preferably works according to an HTTP request and response model. HTTP requests (or any suitable request communication) to the communication platform 100 and/or the queue management resource 110 preferably observe the principles of a RESTful design. RESTful is understood in this document to describe a Representational State Transfer architecture as is known in the art. The RESTful HTTP requests are preferably stateless. The components of the communication platform and/or the interface service preferably do not need to remember or store previous communications to be aware of the state. Additionally or alternatively, the API 120 may be used or accessed through application instructions. The API 120 preferably works around a queue instance resource that allows users to query and manage the state of individual call queues. Call queues can be referenced using a queue identifier. When using a REST API, a particular queue may be referenced by a resource URI with the following pattern: "/2010-04-01/Accounts/{AccountSid}/Queues/{QueueSid}". A queue resource may include various properties such as an identifier, a friendly name (i.e., a user-provided string that identifies the queue), a current size metric, maximum size, average wait time, and/or any suitable property. A queue resource can additionally include a members sub-resource. The members sub-resource is preferably a list of communication sessions currently in the queue. A member instance is preferably the construct or proxy for an enqueued communication session. A member resource can include properties such as data enqueued, wait time, position, queue-state application configuration, and/or any suitable properties. The API 120 is preferably used to query information of the queue resources, but may additionally be used to manipulate or modify aspects of the queue. When the queue resources are used in application instructions, a call router or other suitable communication processor can add, remove, connect, and/or manage members of the queue (i.e., communication sessions of the queue). In one implementation, there is an enqueue instruction, which can be used to add a communication session as a member resource. Attributes of the enqueue instruction can include an action-state application configuration, a wait-state application configuration, other queue-state application configuration, and/or any suitable attribute. The name of the queue may additionally be specified to identify which queue is to be used. If no queue is specified, a default queue can be used. A queue-state application configuration is preferably an absolute or relative URI, but the configuration can alternatively be application logic, an application data file, or any suitable application configuration. Queue-state applications may be limited in their functionality. For example, a wait-state application may be limited to play, say, pause, hangup, redirect, leave, and gather instructions during a telephony communication. Accessing queued members preferably involves using a queue instruction. The queue instruction is preferably specified within a dial instruction. When invoking a queue instruction within a dial instruction, the queue is accessed and the first enqueued communication session is connected. If the queue is empty, one variation may include the dialing entity or agent waiting until a new communication session joins the queue. Alternatively, an error or other suitable response may be returned if the queue is empty or does not exist. An application configuration can be configured with the queue instruction to specify an application to be invoked directly preceding, during, or directly after dequeuing a communication session.

2. Method for Queuing a Communication Session

Figure 2:
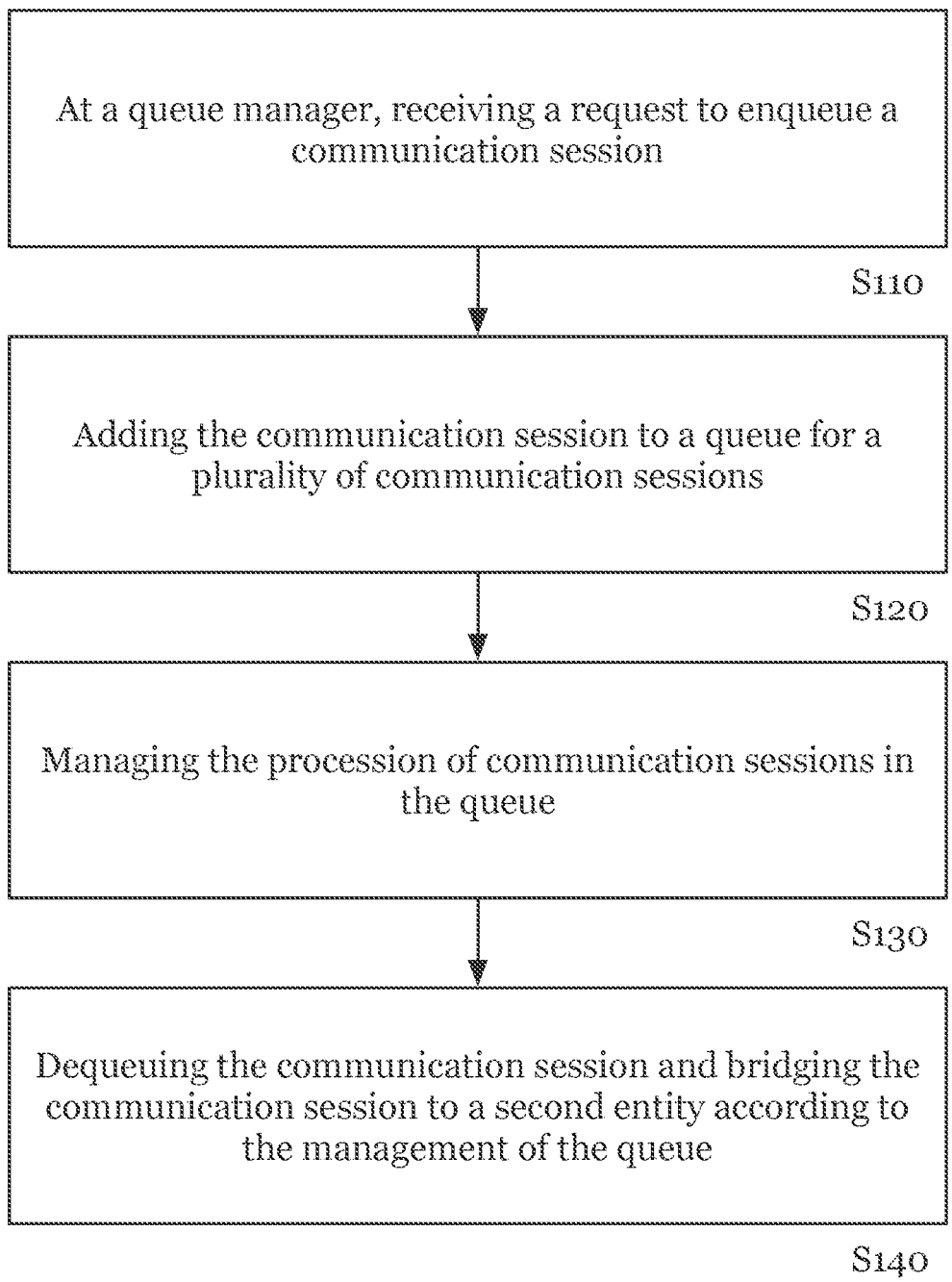
FIG. 2 is a flowchart representation of a first preferred embodiment of the invention.
Figure 3A:
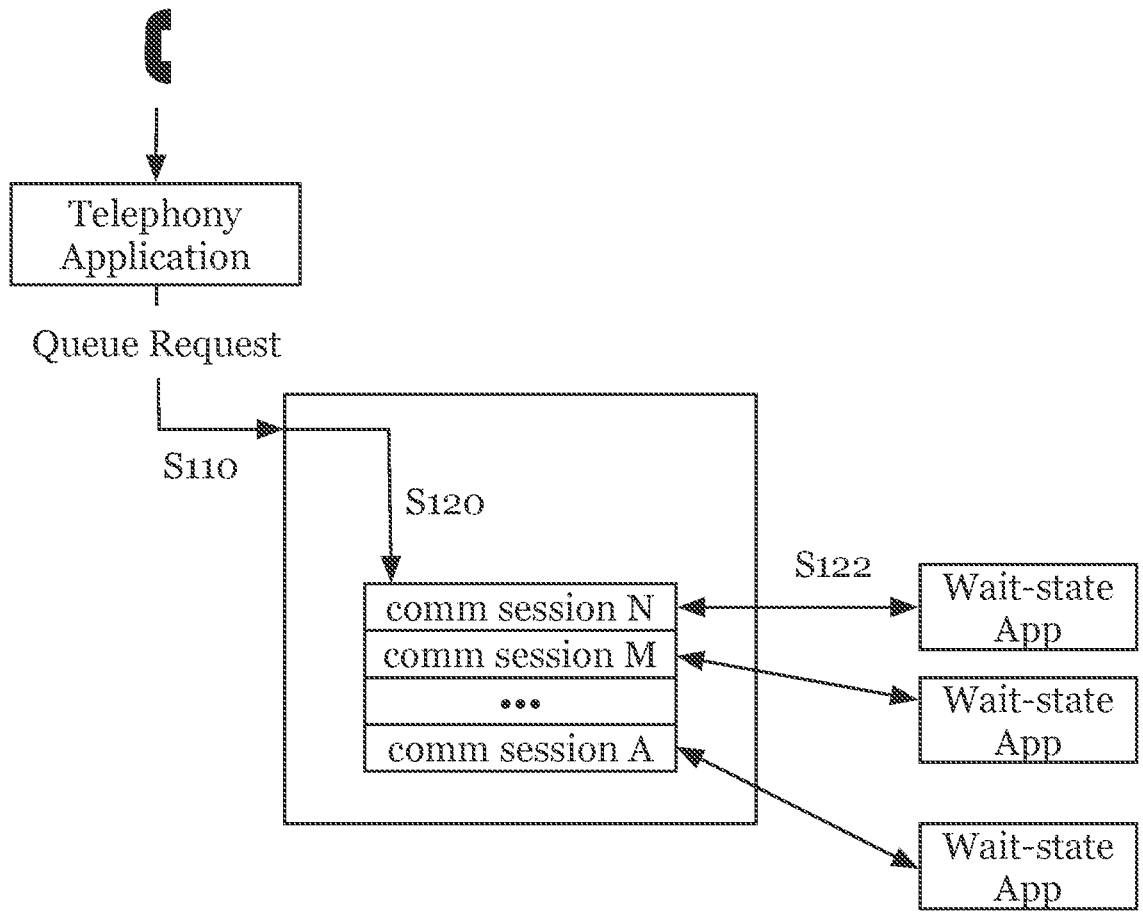
FIGS. 3A and 3B are schematic representations of a preferred embodiment of the invention.
Figure 3B:
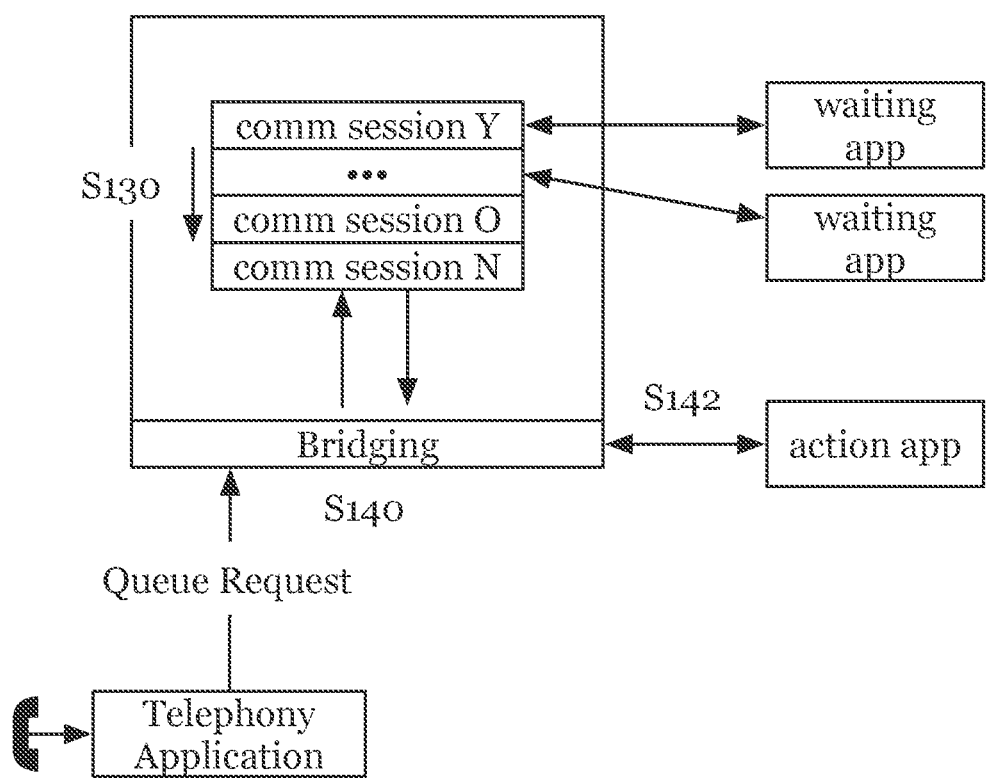

As shown in FIG. 2, a method for queuing a communication session of a preferred embodiment includes at a queue manager receiving a request to enqueue a communication session S110, adding the communication session to a queue for a plurality of communication sessions S120, managing the procession of communication sessions in the queue S130, and dequeuing the communication session and bridging the communication session to a second entity according to the management of the queue S140. As shown in FIGS. 3A and 3B, the method may additionally include transferring control of the communication session to a wait-state application while the communication session is in the queue S122 and/or transferring control of a communication session to an action-state application in response to dequeuing the communication session S142. The method functions to simplify management of concurrent communication sessions of an application. The queue operations are preferably atomic and transactionally safe, which can simplify the development process for developers of applications where such concurrent operations are common (e.g., telephony applications). In telephony applications, the method preferably enables application developers to simply customize the wait state experience for application-facing users. Applied to a telephony platform, the method functions to enable customized "holding" experiences for various telephony applications.

The method is preferably implemented by a system substantially similar to the one described above but any suitable system may alternatively implement the method. The method is preferably used in combination with a communication platform such as one substantially similar to the telephony platform described in published U.S. Pat. No. 8,306,021, issued 2 Apr. 2009, titled "SYSTEM AND METHOD FOR PROCESSING TELEPHONY SESSIONS", but the communication platform may alternatively be any suitable communication platform. In a telephony platform or an alternative suitable platform, a multitenant and scalable resource may facilitate the operation of a plurality of queue managers. In such an embodiment, the telephony platform can preferably enable the benefits of the method for a plurality of different applications/users on the platform. The method is preferably used with voice/telephony-based applications. Voice/telephony-based applications can include synchronous communication sessions over PSTN, SIP, or other suitable voice protocols. The method may additionally or alternatively be applied to other communication protocols such as SMS, MIMS, IP messaging, video, screen sharing, and/or any suitable communication protocol. In many exemplary situations, the queue of the method is used by a telephony application when a resource (e.g., a human customer service representative) is unavailable, but the queue may be used for any suitable purpose such as for limited hardware/software resources, creating transactionally safe operations, and/or any suitable application of a queue.

Step S110, which recites at a queue manager receiving a request to enqueue a communication session, functions to obtain a notification from an entity to add a communication session to a queue. The request is preferably communicated from a telephony application. More preferably, the request is initiated by a telephony application instruction such as in the example request shown in FIG. 4. The communication session is preferably an active telephony/voice call, but may alternatively be a video communication session, a screen sharing session, multi-media session, a gaming session, or any suitable communication session. The communication session preferably represents a currently active or a potentially active communication channel to an entity/user. In one example, a caller may be active on one leg of the communication session while being added to a queue. The application instructions directing logic of the communication session will preferably include an "enqueue" instruction or the equivalent instruction(s). Upon encountering the "enqueue" instruction, the communication instruction is preferably enqueued. The communication session may alternatively not include a live caller connected to the communication session and/or may be a proxy for a communication session—the communication session to enqueue may be an inactive communication session. A proxy communication session may have been programmatically queued, initiated through a asynchronous communication channel (e.g., SMS), be an active call that became inactive during the queuing process, or not have a connected live caller for any suitable reason. The request preferably specifies the account or scope of the queue. In an exemplary use case, the request specifies an account identifier and optionally an explicit queue identifier. Within a multitenant environment, the identifiers of the queue are used to coordinate management of multiple queues simultaneously.

Preferably, the request to enqueue a communication session specifies various queuing parameters that define the queuing behavior for that communication session. The queuing parameters may include a wait-state application, an action-state application, a queue identifier, a time-out, queue error application, and/or any suitable queuing parameter. The wait-state application, the action-state applications, and/or any suitable application parameters are preferably universal resource indicators (URIs) that reference an internet accessible resource with application instructions. The wait-state, action-state, or other applications may alternatively be any suitable reference to a queue-state application. Alternatively, queuing parameters may be specified to define queue behavior for an application, a user-account, a platform, or any suitable entity. As mentioned, the request may specify a queue identifier. The queue identifier may be for an application-based namespace or a global namespace. A default queue for a telephony application or account may be used if a queue identifier is not specified. In other words, the lack of a specified queue identifier within an account may be an implicit identifier for the default queue of the account. If a queue does not yet exist, one is preferably created. If the intended queue is unavailable due to capacity or other limitations, a new queue may be created, an error response taken, or any suitable action may be taken.

S120, adding the communication session to a queue of a plurality of communication sessions, functions to appropriately add the communication session to a queue. The queue is preferably a prioritized or ordered list of communication sessions (i.e., queue members) ordered by priority, and the recently added communication session is preferably added to the end of the communication queue. Depending on the type of queue management policy in place, the communication session may alternatively be placed in any suitable location in the queue. The entities/members in the queue are preferably persistent and may be decoupled from any associated active communication session. In other words, the communication session stored in the queue may be a proxy representative for a prior and/or subsequent communication session. In one exemplary application described in more detail below, a caller may hang-up once they are placed on hold, but their place in the queue is maintained despite the fact that the user no longer has an active communication session. In other words, an active communication session can become inactive while in the queue, and an inactive communication session can become active. An inactive communication session preferably becomes active in various ways. In one variation, the communication session becomes active by the communication platform calling out to the original endpoint of the enqueued communication session. In a second variation, the communication platform can reestablish an active communication session for an incoming communication to the original endpoint made by the endpoint associated with the enqueued communication session. For example, endpoint A calls service B. Service B queues the caller of endpoint A and plays some waiting music. The caller of endpoint A may hang up, and the place of endpoint A is managed in the queue as if the caller was still actively listening to the waiting music. Endpoint A can then call service B a second time, and the communication platform identifies that a communication session is already established between endpoint A and service B, and will reconnect the caller to the enqueued communication session. When added to the queue, the queue manager may additionally begin accounting for the communication session when measuring queue analytics. The queue analytics preferably includes statistics on overall queue properties (e.g., average wait time, number of queued communication sessions, etc.) and individual communication session queue properties (e.g., total wait time, number in line, etc.). The queue analytics is fed back to the wait state application to enable the wait state application to feed back queue information to the enqueued user.

Figure 5:
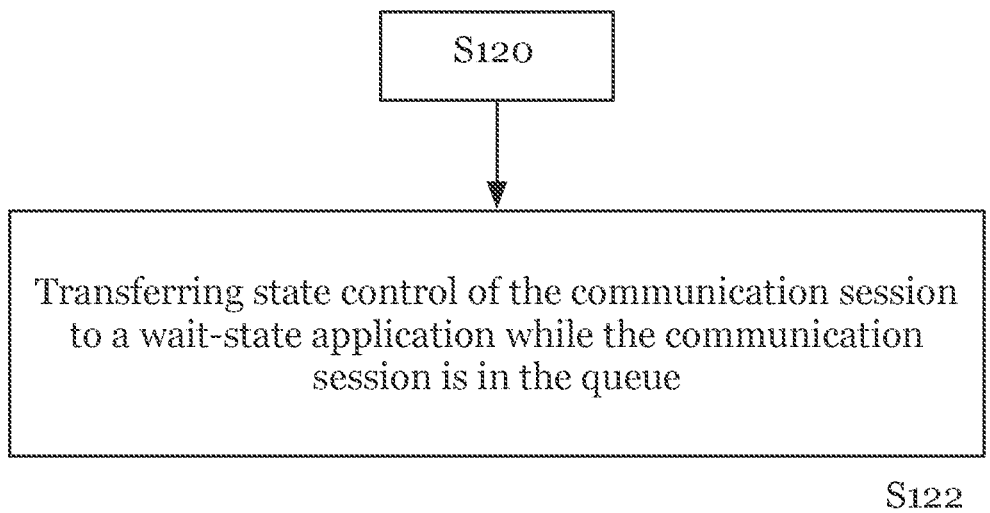
FIG. 5 is a flowchart depicting a variation of the first preferred method for queuing a communication session.
Figure 6:
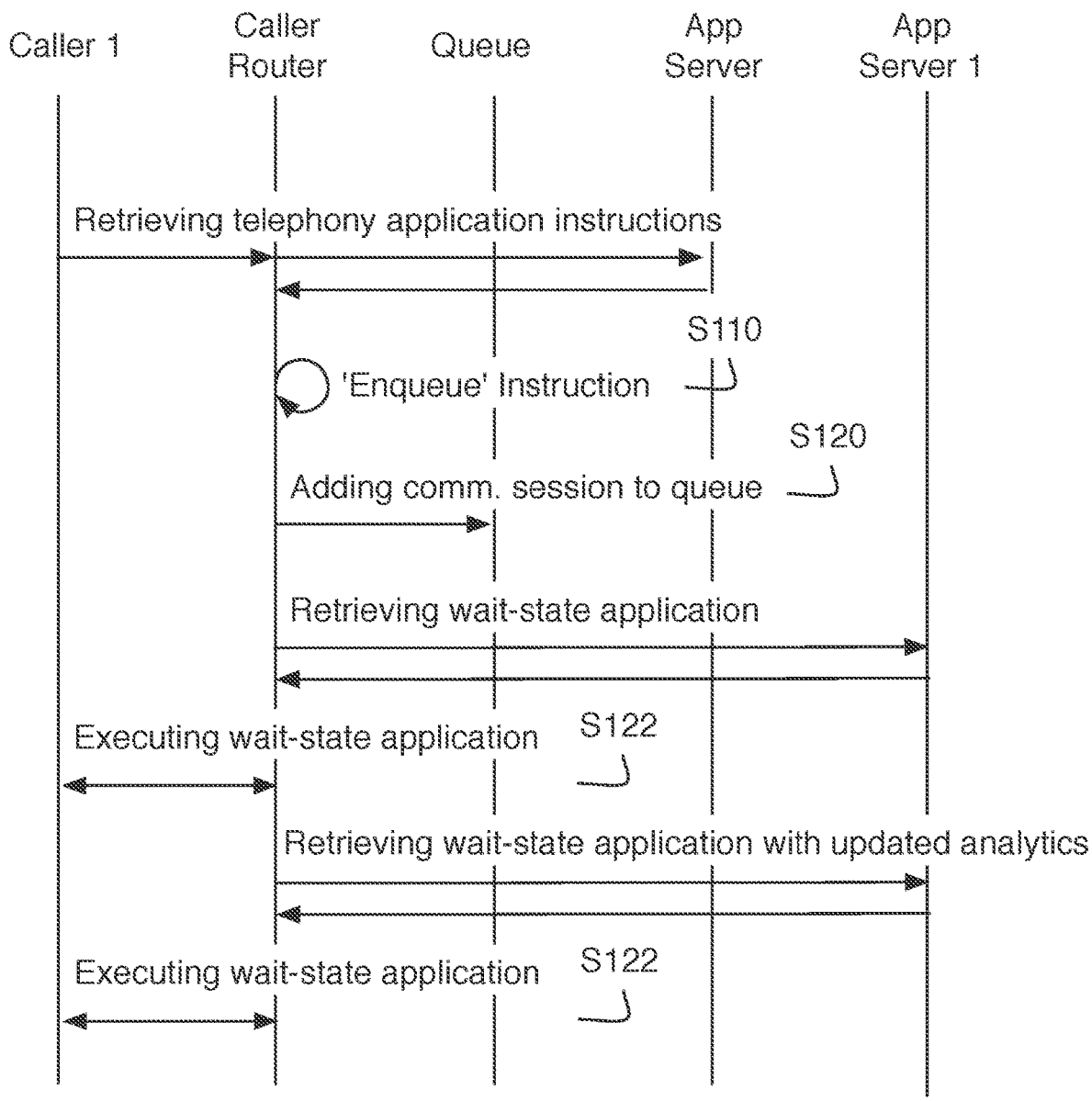
FIG. 6 is a communication flowchart representation of a communication session being enqueued.
Figure 7:
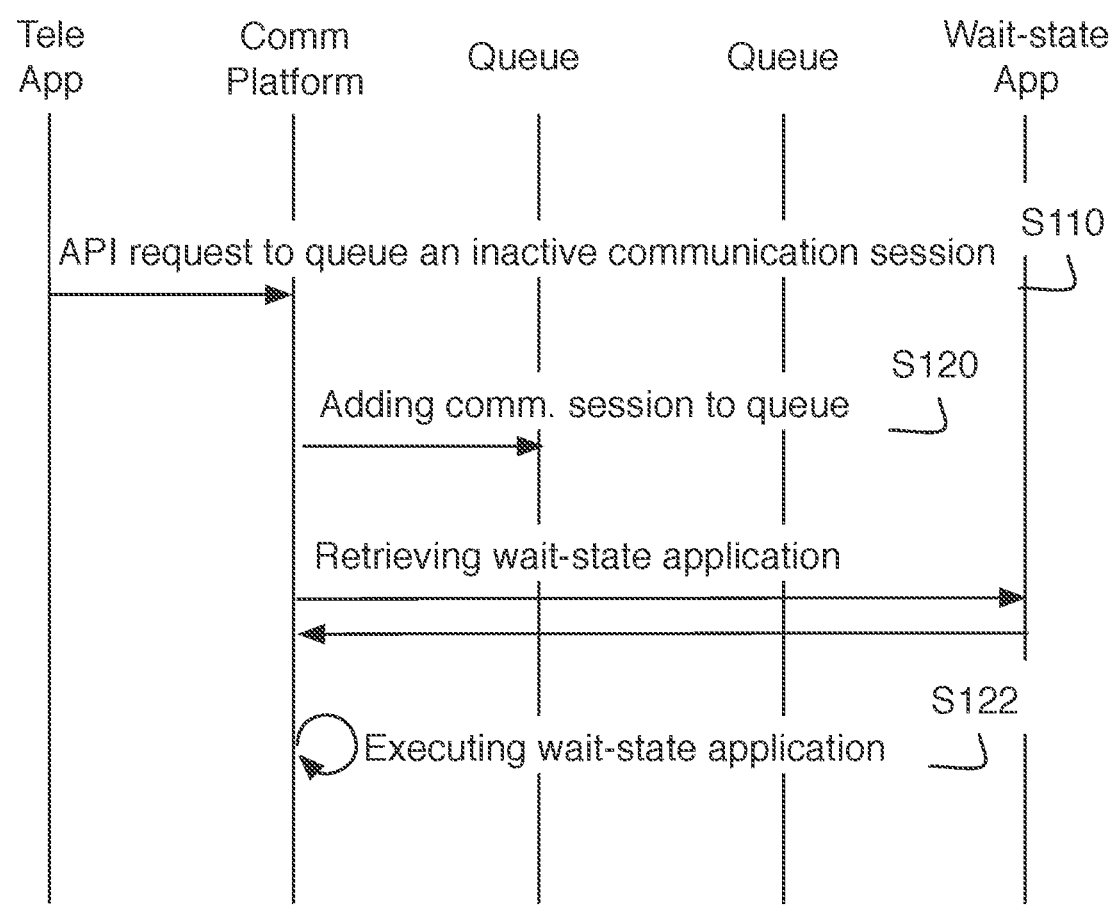
FIG. 7 is a communication flowchart representation of an inactive communication session being enqueued.

Additionally, Step S120 preferably includes transferring control of the communication session to a wait-state application while the communication session is in the queue as shown in FIG. 5, which functions to manage control logic for the communication session while in the queue with a customizable application. As described above, the wait-state application is preferably specified in the queuing request. The wait-state application is preferably created or selected by the application developer, and may be designed to perform any arbitrarily complex application logic. The wait-state application may be a simple application such as a looping audio file, or may be a complex interactive application that may require user input, transfer control to other applications, or perform any arbitrarily complex logic. The wait-state application is preferably an internet accessible resource including instructions such as a telephony markup language document. The telephony communication platform implementing the method or any suitable communication platform preferably facilitates interpreting and executing the control logic of the wait-state application. Accessing the wait-state application (and similarly for other queue-state applications) preferably includes using HTTP to access the URI of the queue-state application. The queue-state applications can reside on outside network accessible resources. The returned document is preferably a document of telephony application instructions formatted into a markup language. The wait-state application is preferably implemented with a looping behavior in that the control logic may be repeated as long as the communication session is enqueued as shown in FIG. 6. More specifically, an HTTP request to the wait-state application URI is preferably initiated each time processing of the wait-state application completes instruction execution. Since the response of the server hosting the queue-state application can dynamically change for different requests, the wait-state application can be dynamically generated to target the current context of the communication session. Current queue analytics may additionally be provided as inputs to the wait-state application (e.g., as HTTP query parameters). In one exemplary application of the queue analytics, input would be communicating a message to the user informing the user of their position in the queue. While the wait-state application can be used for controlling an active communication session, the wait-state application can additionally be used for an inactive communication session as shown in FIG. 7. Additionally or alternatively, other applications may be transferred control of the communication session during other stages of the queue, such as when first joining the queue, when next in line to be dequeued, when a particular queue condition is met, or at any suitable time.

In a variation of a preferred embodiment, the method may include handling an error response after a failure of adding the communication session to a queue, which functions to recover from the situation where a communication session cannot be added to a queue. A communication session may not be able to be added to a queue if the queue is full, if the wait time is beyond a wait limit, or for any suitable reason or error. A failure state application is preferably transferred control of the communication session as part of the error response. A failure state application is preferably configured in a manner substantially similar to the wait-state application and action state application. The failure application is preferably transferred control of the communication session when an error response is received after attempting to add the communication session to a queue. Alternatively or additionally, the failure state application may be invoked for an error at any suitable time such as an error when dequeuing a communication session. The failure state application may provide any suitable application logic for gracefully handling an error. The type of error and any suitable error information may be passed to the failure state application. The failure state application can preferably elect to place the communication session in a second queue. A second queue may be pre-existing or generated in response to the error.

S130, which recites managing the procession of communication sessions in the queue, functions to update the queue based on specified or default queue heuristics. The management of the queue preferably includes adding new communication sessions to the appropriate location, updating priority/order of communication sessions, and dequeuing communication sessions. The queue is preferably configured to apply a standardized queuing heuristic. One exemplary preferred queuing policy would be a "last in, last out" policy, where queued communication sessions are dequeued in the order they are queued. However, the dequeuing and prioritization of sessions may follow any suitable heuristic. Other queuing heuristics may include "first in, last out", a priority-based policy, random selection, or any suitable heuristic to determine the servicing of the queue. The queuing heuristic may be based on properties of the queued communication sessions such as associated account IDs, phone numbers, or any suitable parameter of the communication sessions.

The queue manager may additionally enable customization of queue behavior through specifying a parameter in the queue request or through a queue API. As mentioned, the queue manager may additionally include an interface to enable dynamic queue management. The queue manager preferably has an application programming interface (API) so that an outside party may make changes to the queue and/or query status of the queue. The queue API preferably exposes various API resources, service calls, or other mechanisms that are responsive to requests to add or remove communication sessions from a queue and to requests for analytics of the call queue. The queue API may be used to retrieve queue statistics/analytics, the status of a communication session in the queue, modify the ordering of communication sessions in the queue, add or remove a communication session, alter the behavior of the queue, delete or create queues, and/or perform any suitable action. In providing a queue API interface, the method functions to enable API calls that are responsive to managing members of a queue resource and querying information of the queue. Managing members of the queue preferably includes calls that add, remove, and/or reposition communication sessions in a queue. Querying information of a queue preferably includes accessing overall queue analytics, queue member specific analytics, and/or other forms of information about the queue. The queues are preferably presented as REST API resources. For example, a queue named Foo of account Bar may be targeted in an API request through an API call to "/2010-04-01/Accounts/Bar/Queues/Foo". By issuing an HTTP GET to this queue resource, information about the queue can be retrieved. By issuing an HTTP POST to this resource, properties such as max size, queue name, and other attributes can be changed. Similarly, members of the Foo queue resource (i.e., the enqueued communication sessions) can be targeted with API calls to "/2010-04-01/Accounts/Bar/Queues/Foo/Members/". A list of members can be retrieved or specific communication sessions can be targeted by appending a communication session id or descriptor (e.g., front or back).

S140, which recites dequeuing the communication session and bridging the communication session to a second entity according to the management of the queue, functions to connect the communication session with another party when the communication session is selected to be dequeued. Phrased another way, block S140 functions to establish communication of an enqueued communication session with a second entity. Bridging the communication session to a second entity can include establishing a connection between a second endpoint and the endpoint of the communication session. If the communication session is active this may simple include merging the enqueued communication session with a second communication session, where the second communication session is one established between the second entity and at least the communication platform. If the communication session is inactive, bridging may include calling out or re-establishing an active communication session with the original caller (i.e., the user associated with the enqueued communication session), and then subsequently merging the communication session with a second communication session. The second entity is in many exemplary situations associated with a limited resource that necessitated the need of the queue. For example, the second entity may be a voice connection to a customer representative (i.e., the dequeuer) for whom an initial caller had been waiting. The second entity may alternatively be an application or device with less capacity than demand. The dequeuing of the communication session may be initiated by the second entity, but a request to dequeue a communication session may alternatively be made by any suitable party. In one embodiment, the second entity is a telephony application that dials the queue to initiate bridging with the next communication session in the queue. As shown in FIG. 8, telephony application instructions can be used to instruct an agent or second entity to call a queue, wherein the queue is specified by a queue identifier. Alternatively, a communication session may be dequeued in response to an API call to the queue or from an intermediary application/party messaging the queue. In one variation, the API call to dequeue may be directed at the communication session automatically selected by the call queue (e.g., the communication first in line), but the API call may alternatively be directed at a specific communication session contained in the queue. The API call is preferably used in transferring the communication session to an application. The transferred application is preferably referenced by a URI in a manner similar to those described above. The application preferably includes telephony instructions that instruct a call router on controlling state and engaging a connected user. The transferred application can perform any suitable logic such as call out to an agent and bridging a communication session between the queued entity and the agent. The application could alternatively be any suitable application logic. The queue is preferably configured to be responsive to various forms of dequeueing, such as the variation of a dequeuing agent calling into the queue and bridging the two entities or the variation of transferring the communication session to an second application. The dequeued communication session is preferably one of the set of enqueued communication sessions that is next for queue servicing. Determining the next communication session is based on the procession of communication sessions in block S130. For example, if the queue is a first in first out queue, then the dequeued communication session is the communication queue that has been in the queue for the longest amount of time.

Figure 9:
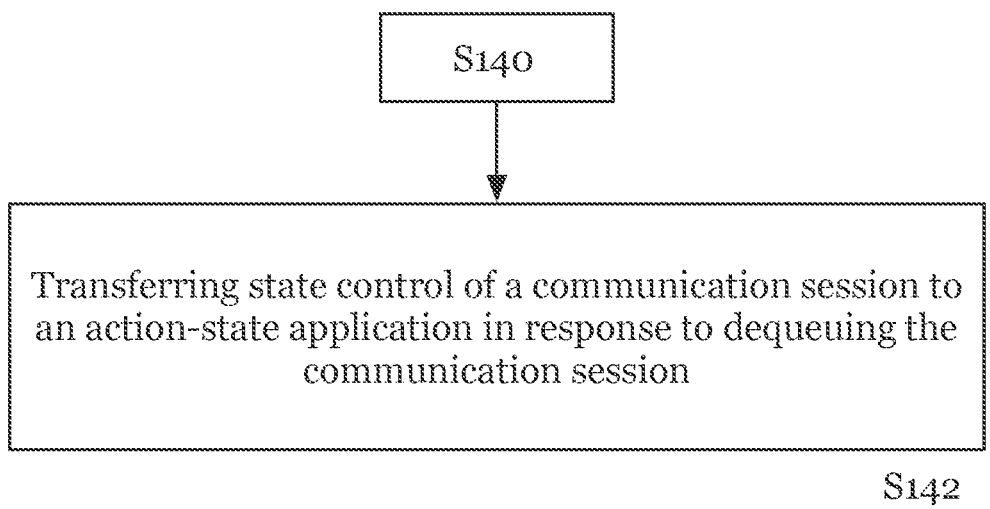
FIG. 9 is a flowchart depicting another variation of the first preferred method for queuing a communication session.
Figure 10:
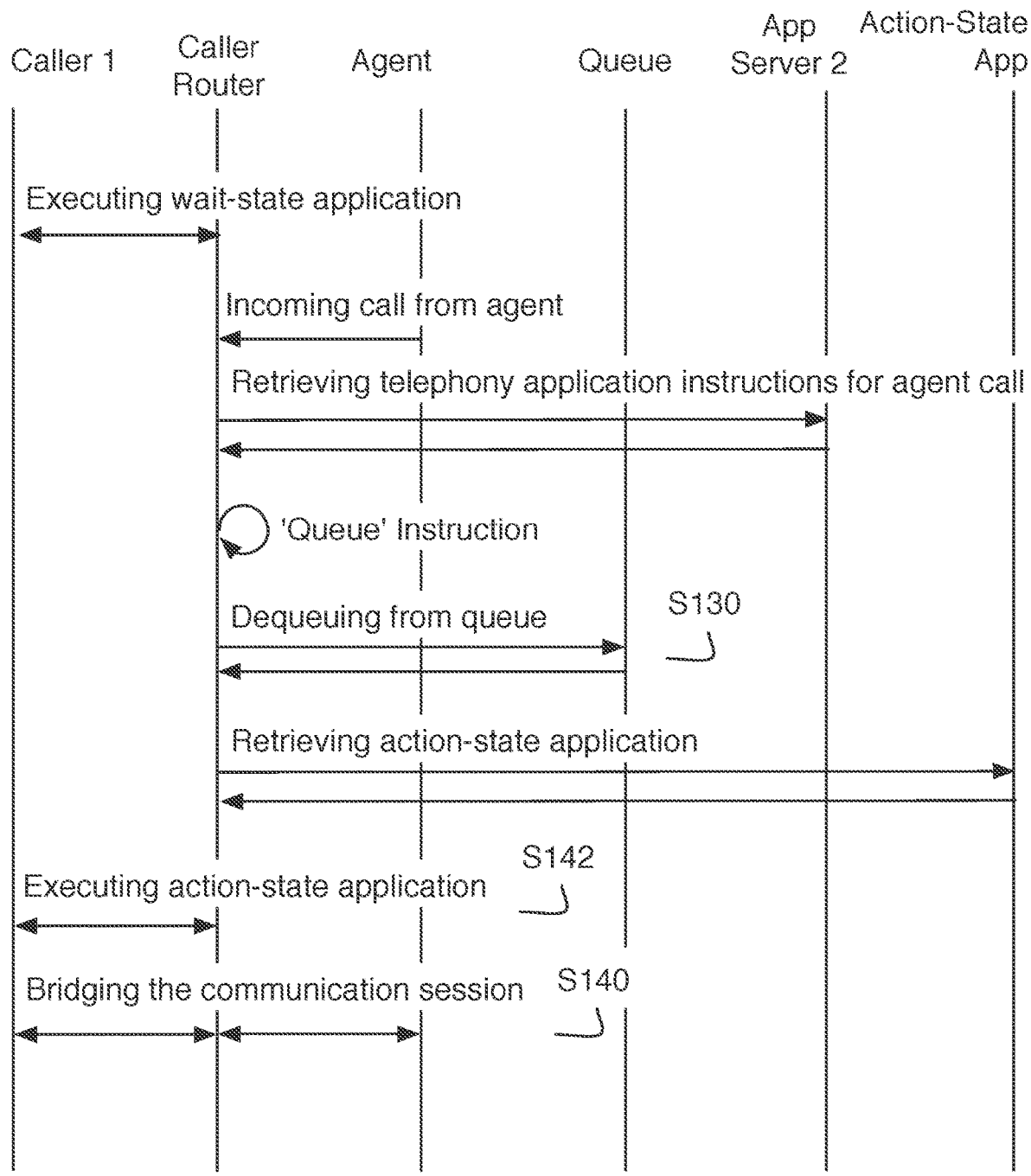
FIG. 10 is a communication flowchart representation of dequeuing a communication session.

Additionally, step S140 preferably includes transferring control of a communication session to an action-state application in response to dequeuing the communication session S142 as shown in FIG. 9, which functions to perform actions for the transition from the enqueued state to a state of being bridged with a second entity. The action-state application is preferably an application substantially similar to the wait-state application described above. The action-state application, however, is preferably selected or designed to facilitate the transition out of the queue. In one exemplary embodiment, the action-state application is designed to play the message, "Thank you for waiting. We are now connecting you" to the user connected to the communication session. In another exemplary embodiment, there may not be an active voice session for the dequeued communication session, and the action-state application may be designed to establish a voice connection with the user associated with the dequeued communication session before bridging the communication session with the second entity. The action-state application may alternatively be any suitable application. After completion of the action-state application, the selected communication session is preferably bridged with the second entity as described above and shown in FIG. 10.

The customizable queue of the preferred embodiment may be utilized be developers to create a wide variety of queue systems. As a first example application of a preferred embodiment, the method may be employed to enable a call waiting system where callers are not required to stay on the line. A caller can preferably communicate that they would like to hold a place in line. In one variation, the user may be placed in the line due to the control logic of a telephony application with which the user has a voice connection. Once a place in the line has been established, the user may hang up while the communication session remains queued in the persistent queue. In a second variation, the user may use an alternative form of communication to initiate getting in line. For example, the user may send a text message to a specified number, that number may be directly associated with the queue or may be associated with an application that enqueues a communication session on behalf of the user. Similarly, a communication session may be automatically enqueued without direct initiation of a user. This variation functions to illustrate how an active communication session does not need to exist prior to being enqueued. As an additional feature, while the communication session is enqueued, a wait-state application may facilitate a user establishing a connection to the enqueued communication session. The user may call a number that identifies the associated queued communication session, and connects the user with the communication session in the queue as if the user never left the holding state. Similarly, the user may send a message to a phone number and in response, receive a message indicating the wait time, position in line, and/or any suitable message. When the communication session is dequeued and there is no active connection to the queued communication session, the action-state application preferably establishes a connection with the intended user. So for a user that had hung up when placed on hold, the system preferably calls the user. After the caller has an active connection then the call is preferably bridged with the intended person or device. In a second exemplary application of a preferred embodiment, the API of a queue is preferably used to dynamically alter the waiting experience of a user. A user may have been placed in a line waiting for the next available customer representative. While waiting for the customer representative, the user may listen to a message controlled by the wait-state application. The wait-state application may include an advertisement of a way to skip ahead in the line. For example, a user may receive queue priority by listening to an advertisement, answering a survey, agreeing to be charged a fee, or through any suitable action. In response to the action of the user, the wait-state application preferably uses the queue API to alter the ordering of the communication sessions in the queue so that the user will be dequeued sooner than if they had not performed that action.

A system for an alternative embodiment preferably implements the above methods in a computer-readable medium storing computer-readable instructions. The instructions are preferably executed by computer-executable components preferably integrated with a queue manager of a telephony/communication platform. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device. As mentioned above, the queue manager is preferably integrated with a telephony/communication platform. More preferably the queue manager is integrated into a cloud hosted communication platform. As part of a cloud computing infrastructure, a cluster of a queue managers preferably are preferably coordinated to manage the allocation and deallocation of queues, load balancing of communication sessions in the queues, and any suitable issues of managing a plurality of queues in a multitenant environment.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
    receiving an Application Programming Interface (API) call that includes a request to place a hold on a communication session associated with a device;
    in response to receiving the API call, adding the communication session to a communication queue, the adding of the communication session including deactivating the communication session, the deactivated communication session comprising a communication endpoint to be connected upon reactivating the communication session associated with the device; and
    retrieving a wait-state application for the deactivated communication session while the communication session remains in the communication queue.

2. The method of claim 1, wherein the request comprises a resource identifier associated with an internet resource that provides the wait-state application.

3. The method of claim 2, further comprising:
    transmitting an application request to the internet resource based on the resource identifier to place the communication session on hold.

4. The method of claim 3, further comprising:
    receiving, from the internet resource, a set of computer executable instructions; and
    executing the set of computer executable instructions to retrieve the wait-state application while the communication session is placed on hold.

5. The method of claim 1, wherein the request comprises a queue identifier associated with the communication queue, further comprising:
    adding the communication session to the communication queue based on the queue identifier.

6. The method of claim 1, further comprising:
    processing the communication queue in a first-in-first-out order.

7. The method of claim 1, further comprising:
    repeatedly invoking the wait-state application; and
    receiving updates of a wait position of the communication session in the communication queue.

8. The method of claim 1, further comprising:
    detecting that a wait position of the communication session in the communication queue is changed; and
    transmitting a message based on the detecting.

9. The method of claim 1, wherein the request comprises a plurality of queuing parameters that correspond to one or more of the wait-state application, a queue identifier, a resource identifier, an action state application, a time-out duration, and a queue error application.

10. The method of claim 9, wherein the plurality of queuing parameters comprises Universal Resource Identifiers (URIs) that reference one or more internet-accessible resources with application instructions.

11. A system comprising:
    one or more hardware processors; and
    one or more computer-readable mediums storing instructions that, when executed by the one or more hardware processors, cause the system to perform operations comprising:
    receiving an Application Programming Interface (API) call that includes a request to place a hold on a communication session associated with a device;
    in response to receiving the API call, adding the communication session to a communication queue, the adding of the communication session including deactivating the communication session, the deactivated communication session comprising a communication endpoint to be connected upon reactivating the communication session associated with the device; and
    retrieving a wait-state application for the deactivated communication session while the communication session remains in the communication queue.

12. The system of claim 11, wherein the request comprises a resource identifier associated with an internet resource that provides the wait-state application.

13. The system of claim 12, wherein the operations further comprise:
    transmitting an application request to the internet resource based on the resource identifier to place the communication session on hold.

14. The system of claim 13, wherein the operations further comprise:
    receiving, from the internet resource, a set of computer executable instructions; and
    executing the set of computer executable instructions to retrieve the wait-state application while the communication session is placed on hold.

15. The system of claim 11, wherein the request comprises a queue identifier associated with the communication queue, further comprising:
    adding the communication session to the communication queue based on the queue identifier.

16. The system of claim 11, wherein the operations further comprise:

processing the communication queue in a first-in-first-out order.

17. The system of claim 11, wherein the operations further comprise:
   repeatedly invoking the wait-state application; and
   receiving updates of a wait position of the communication session in the communication queue.

18. The system of claim 11, wherein the operations further comprise:
   detecting that a wait position of the communication session in the communication queue is changed; and
   transmitting a message based on the detecting.

19. The system of claim 11, wherein the request comprises a plurality of queuing parameters that correspond to one or more of the wait-state application, a queue identifier, a resource identifier, an action state application, a time-out duration, and a queue error application.

20. A non-transitory computer-readable medium storing instructions that, when executed by one or more computer processors of a communication platform, cause the communication platform to perform operations comprising:
   receiving an Application Programming Interface (API) call that includes a request to place a hold on a communication session associated with a device;
   in response to receiving the API call, adding the communication session to a communication queue, the adding of the communication session including deactivating the communication session, the deactivated communication session comprising a communication endpoint to be connected upon reactivating the communication session associated with the device; and
   retrieving a wait-state application for the deactivated communication session while the communication session remains in the communication queue.

* * * * *